United States Patent Office 3,255,176
Patented June 7, 1966

3,255,176
METHYL N-ACYLTHIOLINCOSAMINIDES
Brian Bannister, Kalamazoo, Mich., assignor to The Upjohn Company, Kalamazoo, Mich., a corporation of Delaware
No Drawing. Filed Apr. 13, 1964, Ser. No. 359,467
2 Claims. (Cl. 260—210)

This invention relates to novel compounds and is particularly concerned with novel methyl N-acylthiolincosaminides [methyl 6-acylamido-6,8-dideoxy-1-thio-D-erythro-D-galacto-octopyranosides] (II), and a method for the preparation thereof.

The novel compounds of this invention and the process for the production thereof can be illustratively represented in the following manner:

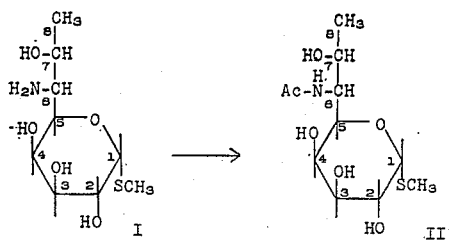

wherein Ac is the acyl radical of a hydrocarbon carboxylic acid containing from 2 to 8 carbon atoms.

The process of the present invention comprises: reacting methyl thiolincosaminide (I) in a lower alkanol solution with an acid anhydride of a hydrocarbon carboxylic acid, defined as above, to obtain a methyl N-acylthiolincosaminide (II). As the lower alkanol, methanol, ethanol, 1-propanol, 2-propanol, 1-butanol, t-butyl alcohol, or the like may be used. Instead of an acid anhydride in a lower alkanol, an acyl chloride may be used in the presence of a hydrogen chloride acceptor, such as triethylamine, pyridine, or the like.

The novel compound, methyl N-acetylthiolincosaminide is an important intermediate in the preparation of pharmacologically active products. For example, methyl N-acetylthiolincosaminide can be converted to methyl N-acetyl-3,4-O-isopropylidenethiolincosaminide with acetone and sulfuric acid; the latter compound can be converted with nickel in a lower alcohol to N-acetyl-3,4-O-isopropylidene-1-deoxylincosamine (or N-acetyl-3,4-O-isopropylidene-1,5-anhydrolincosaminol), which can be alkylated with methyl iodide to 7-O-methyl-N-acetyl-3,4-O-isopropylidene-1-deoxylincosamine (7-O-methyl-N-acetyl-3,4-O-isopropylidene-1,5-anhydrolincosaminol). The last named compound is highly active against *Trichophyton rubrum, Pseudomonas fluorescens* and other microorganisms. The antimicrobial activity of 7-O-methyl-N-acetyl-3,4-O-isopropylidene-1-deoxylincosamine can be utilized for washing equipment in hospitals, homes, and microbiological laboratories, and for washing medical and surgical instruments as well as clothing used in laboratories specializing in the cultivation of microorganisms. Also, in such locations where sterile backgrounds are necessary, floors, walls and ceilings can be washed with aqueous solutions of these compounds.

Other N-acyl-7-O-methyl-3,4-O-isopropylidene-1-deoxylincosamines, wherein the acyl group is propionyl, butyryl, valeryl, hexanoyl, benzoyl, phenylacetyl, phenylpropionyl, and the like can be likewise used for sanitation in homes, hospitals, laboratories, and the like.

The starting material, methyl thiolincosaminide, is a novel starting material and is produced as shown in the preparation.

In carrying out the process of the present invention, methyl thiolincosaminide, dissolved in a lower alkanol such as methanol, ethanol, 2-propanol, 1-propanol, butyl alcohol, t-butyl alcohol or the like is reacted with acetic anhydride. The reaction is usually carried out at a temperature between −20 and +50° C., preferably from 10 to 30° C. Higher temperatures are operative; however, acylation of some of the free hydroxy groups will occur and therefore yields are smaller. In the preferred embodiment of this invention the reaction is carried out with an excess of acetic anhydride, but using generally not more than two times the calculated amount. The thus-produced compound II (Ac=acetyl) is recovered by conventional procedures, shown more precisely in the example.

PREPARATION

Methyl thiolincosaminide

A solution of 4 g. of lincomycin [U.S. Patent 3,086,912] in 20 ml. of hydrazine hydrate (98–100%) was refluxed for 21 hours; excess hydrazine hydrate was then removed in vacuo under nitrogen at steam bath temperature. The residue, a pasty mass of crystals, was cooled, acetonitrile was added, and the mixture was stirred until the crystals were suspended. The crystals were collected on a filter, washed with acetonitrile and with ether. The yield of white, crystalline methyl thiolincosaminide after drying in vacuo at room temperature was 2.1 g. (84%). Recrystallization was accomplished by dissolving the methyl thiolincosaminide in hot dimethylformamide and adding an equal volume of ethylene glycol dimethyl ether.

Methyl thiolincosaminide has a melting point of 225–228° C., an optical rotation of $[\alpha]^{D25} +276°$ (c.=0.768, water), and a pKa' of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

EXAMPLE

Methyl N-acetylthiolincosaminide

Five grams of methyl thiolincosaminide (about 0.02 mole) was suspended with stirring in 50 ml. of methanol and treated with 4.04 g. (about 0.04 mole) of acetic anhydride. The starting material dissolved almost completely, and thereafter the mixture became solid. After 18 hours at room temperature (about 25° C.), the solid was filtered, washed with methanol, and dried in a vacuum oven at 50° C. and 15 mm. pressure; yield, 4.58 g. (79%) of crystalline product melting at 242–245° C. This product was recrystallized from absolute methanol to give colorless needles of methyl N-acetylthiolincosaminide having a melting point of 243–245° C. and a rotation, $[\alpha]_D^{25} +265°$ (c.=0.7374, water).

*Analysis.*—Calcd. for $C_{11}H_{21}O_6NS$: C, 44.72; H, 7.17; N, 4.74; S, 10.85. Found: C, 44.87; H, 7.10; N, 4.65; S, 10.99.

In the manner shown in the example, other acyl derivatives of methyl thiolincosaminide can be made, using other anhydrides, such as propionic anhydride, butyric anhydride, valeric anhydride, hexanoic anhydride, benzoic anhydride, phenylacetic anhydride, phenylpropionic anhydride, and the like. Representative methyl N-acylthiolincosaminides thus obtained include methyl N-propionyl-, N-butyryl-, N-valeryl-, N-hexanoyl-, N-benzoyl-, N-phenylacetyl-, N-phenylpropionylthiolincosaminide, and the like.

I claim:
1. Methyl N-acylthiolincosaminides of the formula:
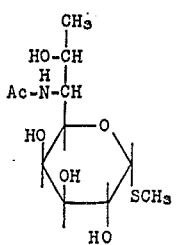
wherein Ac is an acyl radical of a hydrocarbon carboxylic acid containing from 2 to 8 carbon atoms.
2. Methyl N-acetylthiolincosaminide.
References Cited by the Examiner
Stanek et al.: "The Monosaccharides," 1963, pp. 509–511, Academic Press, New York, N.Y.
LEWIS GOTTS, *Primary Examiner.*
JOHNNIE R. BROWN, *Assistant Examiner.*